US 6,533,054 B1

(12) United States Patent
Fey

(10) Patent No.: US 6,533,054 B1
(45) Date of Patent: Mar. 18, 2003

(54) DRIVE UNIT FOR AN ELECTRICALLY OPERATED VEHICLE

(75) Inventor: Rainer Fey, Schweinfurt (DE)

(73) Assignee: SRAM Deutschland GmbH (DE)

( * ) Notice: Subject to any disclaimer, the term of this patent is extended or adjusted under 35 U.S.C. 154(b) by 0 days.

(21) Appl. No.: 09/647,294

(22) PCT Filed: Dec. 14, 1999

(86) PCT No.: PCT/EP99/09876

§ 371 (c)(1),
(2), (4) Date: Sep. 28, 2000

(87) PCT Pub. No.: WO00/44612

PCT Pub. Date: Aug. 3, 2000

(30) Foreign Application Priority Data

Jan. 29, 1999 (DE) .......................... 199 03 443

(51) Int. Cl.[7] .............................. B60K 6/04; B60K 41/02
(52) U.S. Cl. ....................................... 180/65.3; 180/342
(58) Field of Search .............................. 180/65.1, 65.3, 180/65.4, 65.6, 53.1, 54.1, 337, 338, 342, 65.2, 214

(56) References Cited

U.S. PATENT DOCUMENTS

| 3,570,620 A | * | 3/1971 | Fisher et al. ................. 180/214 |
| 3,799,284 A | * | 3/1974 | Hender ....................... 180/65.2 |
| 4,074,160 A | * | 2/1978 | Broadway ................... 310/112 |
| 4,341,982 A | * | 7/1982 | Lahti et al. ................ 104/300 |
| 4,351,406 A | * | 9/1982 | Fields et al. ............... 180/65.2 |
| 4,655,312 A | * | 4/1987 | Frantom et al. ............. 180/268 |
| 5,125,469 A | * | 6/1992 | Scott ......................... 180/65.2 |
| 5,172,784 A | * | 12/1992 | Varela, Jr. ................. 180/65.4 |
| 5,195,600 A | * | 3/1993 | Dorgan ........................ 180/9.1 |
| 5,253,724 A |   | 10/1993 | Prior |
| 5,388,176 A | * | 2/1995 | Dykstra et al. .............. 388/811 |
| 5,429,543 A | * | 7/1995 | Tilbor et al. ................ 446/456 |
| 5,624,347 A | * | 4/1997 | Yang ............................. 477/5 |
| 5,671,821 A |   | 9/1997 | McGreen |
| 5,865,267 A |   | 2/1999 | Mayer et al. |
| 5,881,559 A | * | 3/1999 | Kawamura .................... 60/597 |
| 5,991,683 A | * | 11/1999 | Takaoka et al. ............. 701/102 |
| 6,026,921 A | * | 2/2000 | Aoyama et al. ............ 180/65.2 |
| 6,044,922 A | * | 4/2000 | Field ........................ 180/65.2 |
| 6,059,059 A | * | 5/2000 | Schmidt-Brucken ....... 180/65.3 |
| 6,083,139 A | * | 7/2000 | Deguchi et al. ............... 477/5 |
| 6,104,154 A | * | 8/2000 | Harada et al. ............. 318/362 |
| 6,116,363 A | * | 9/2000 | Frank ........................ 180/65.2 |
| 6,118,237 A | * | 9/2000 | Kikuchi et al. ............. 318/139 |

FOREIGN PATENT DOCUMENTS

| DE | 19709579 | 9/1998 |
| DE | 19903443 | 8/2000 |
| EP | 0561268 | 9/1993 |

* cited by examiner

Primary Examiner—Brian L. Johnson
Assistant Examiner—Bridget Avery
(74) Attorney, Agent, or Firm—Milan Milosevic; Lisa Wunderlich

(57) ABSTRACT

A drive unit for electrically-operated vehicles. Two electromotors which can be electrically switched in series or in parallel, optionally, are used in the drive unit in order to obtain a high degree of efficiency and a high degree of overload protection for the batteries. The motors can also be controlled with pulse width modulation by means of an electronic control unit, which enables the current load of the batteries to be kept within stipulated limits. Other advantages of the invention lie in the better use that is made of the construction space, the lower production costs and the use of economical construction materials.

11 Claims, 2 Drawing Sheets

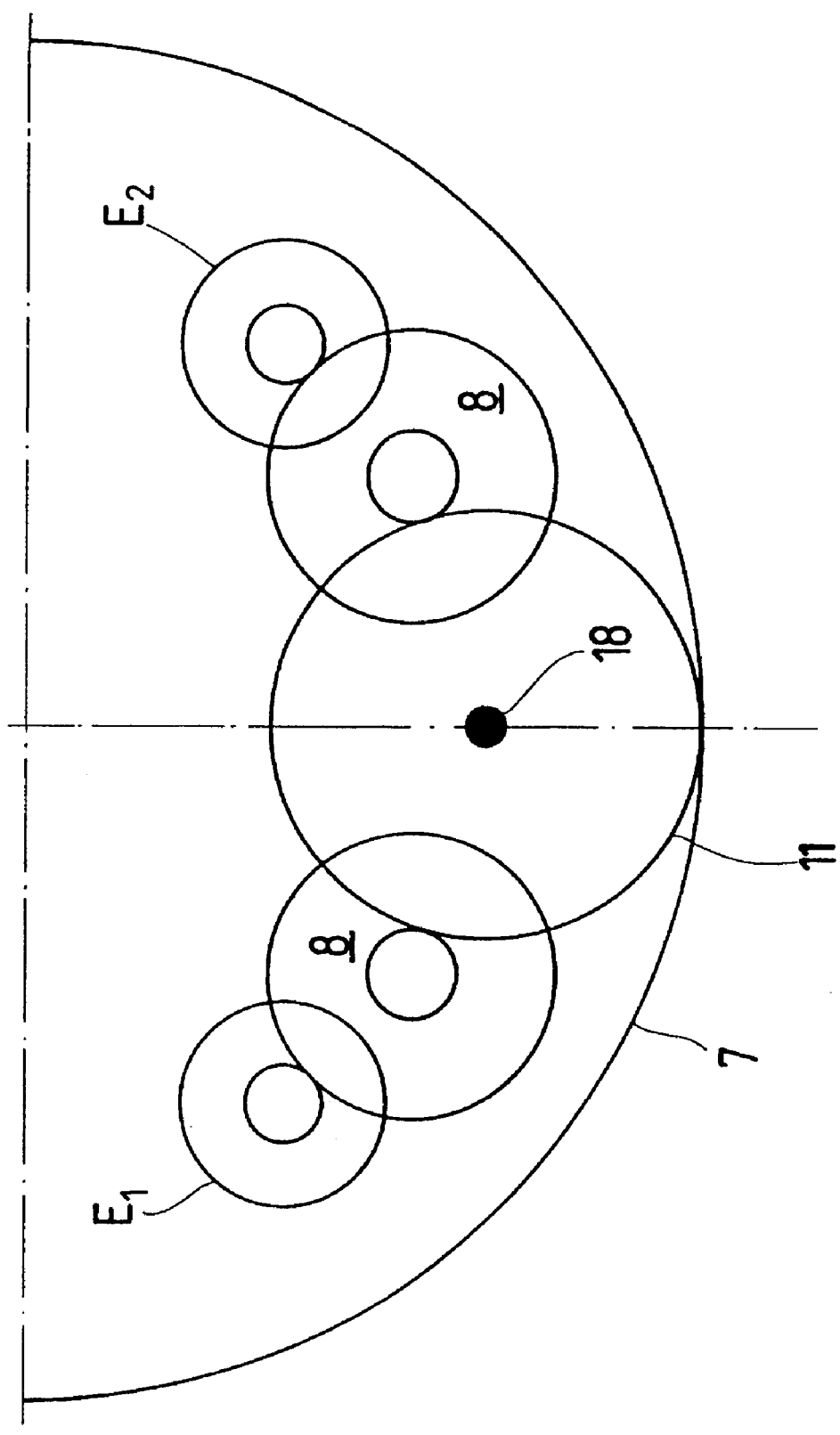

DRIVE UNIT FOR AN ELECTRICALLY OPERATED VEHICLE

BACKGROUND OF THE INVENTION

The invention relates to a drive unit for electrically powered vehicles, especially for electrically driven cycles, for driving at least one wheel.

A motor-wheel drive unit, which comprises a disk-like housing having a rotating section and a fixed section, the rotating section being coupled to the wheel, was disclosed by European patent EP 0 561 268 B1. The fixed section is connected to the cycle frame and serves as carrier for a wheel drive motor, which is powered by a battery, together with a speed reduction gear, which connects the motor on the fixed section to the rotating section. The fixed section finally also has a control circuit component of a control unit, which controls the motor torque according to the torque introduced by way of the pedal drive.

The electrical power is provided by a battery, which is subjected to maximum loading especially on starting of the vehicle, since the electric motor is capable of developing high torques particularly at lower speeds. In the meantime developments in the manufacture of high-voltage current batteries have progressed so that it is now possible, for example with NiCa batteries, to provide high current strengths, at least for brief periods. The disadvantage to this is that such batteries are not only expensive, but also have a limited life. Furthermore, the capacity for recharging is governed by certain rules, in which users of motor-powered cycles are not always prepared to acquiesce. Thus, for example, the recharging of partially discharged batteries presents problems, since the full capacity can no longer be utilized owing to the memory effect. Moreover, comparing a NiCa battery with a lead battery having the same storage capability the purchase costs of the lead battery amount to approximately one fifth of the purchase costs of a NiCa battery. The advantages of lead batteries also lie in their universally regulated disposal and in the fact that toxic cadmium is not used.

The proposed drive unit for electrically powered vehicles relates to a drive solution, the object of which is to act in association primarily with conventional lead storage batteries as battery. Because the battery may be damaged by an excess of current strength through the drive, it is proposed to provide two motors to drive one wheel, the said motors either being electrically connected in series or in parallel by an electronic control unit, or by means of pulse-width modulated actuation in the case of a parallel connection only being loaded in a certain phase. For starting the vehicle it is proposed that the two motors be connected in series and that the electric motors be switched to parallel operation on reaching a certain number of revolutions which corresponds to a slower speed of the vehicle.

Dividing the power between two motors halves the feed cable-related power loss and also halves the voltage drop and peak current, which leads to the following advantages:

The battery is no longer loaded with high peak currents, which means that low-cost lead storage batteries can be used instead of expensive NiCa storage batteries.

By halving the voltage drop it is possible to operate with a lower battery voltage, so that standard batteries can be used.

The lower power consumption means that the battery capacity and hence the weight can be reduced.

A further advantage lies in the fact that the structural design of a drive unit for electrically powered vehicles with two electric motors is more easily manageable than a similar unit with only one motor. A further objective of the proposed design was to keep the costs of providing the electric motors low, an objective which has been impressively achieved by the use of small motors, which are widely available on the market for other purposes.

Finally, another advantage to have emerged is that the power transistors for the modulated current supply of the individual motors are available at low cost and can be better controlled in their thermal reactions than a single power transistor for a large electric motor.

The pulse-width modulated actuation of the two electric motors is used for moderate cycle speeds up to a pulse duty factor of 50%, the current supply phase of one electric motor coinciding with the open-circuit phase of the other electric motor and vice-versa. To spare the battery, the pulse duty factor does not exceed the 50% mark. Only at higher speeds, when the electric motors are running with reduced current strength, is the pulse duty factor between 50% and 100% utilized, 100% corresponding to the top speed of the vehicle.

Another advantage results from the fact that all the control adjustments of the electronic control unit can be performed as a function of the speed. For this purpose it is necessary to continuously compare the number of pedal revolutions with the number of revolutions of the wheel, electrical power being released only at a number of pedal revolutions proportional to the speed in the case of the proposed embodiment of a drive unit. In this way it is ensured by simple means that muscle power is being used to drive the cycle at all times.

Both of the above-mentioned speeds can be scanned in the drive unit. A plurality of magnets is fitted on the circumference of the hub and these are scanned by means of a reed switch in order to sense the speed of the wheel.

A multipole ring magnet is fitted on the planet carrier of the integrated multi-speed hub for sensing the number of pedal revolutions. Two Hall sensors at offset angles of rotation detect the speed and the direction of rotation of the ring magnet through the aluminum housing. Only the changes between the north and south poles of the magnets are used for control purposes. These represent defined angles on the circumference and permit precise control.

For control purposes the angular velocities of wheel and planet carrier are compared. If the difference exceeds a predetermined factor, the drive unit is switched off. By using a factor rather than a fixed value as the default it is possible to switch off substantially faster at higher speeds, which improves safety.

The object of the invention, therefore, is to create a drive unit for electrically powered vehicles, which can be operated with ordinary lead storage batteries and which, integrating the muscle power involved in pedaling, has a measured current supply, which is associated with improved utilization of the battery in order to achieve the maximum possible range for the lowest possible battery weight.

In order to achieve this object a circuit for adjustment of the muscle power, at least two separately actuatable electric motors together with control electronics and a lockup clutch for the freewheel clutch are provided in a common hub body.

One embodiment of a drive unit will be explained with reference to basic drawings, in which:

BRIEF DESCRIPTION OF THE DRAWINGS

FIG. 2 shows the arrangement of the transmission on the transmission carrier with two electric motors and an internal gear for transmitting the applied torque to the wheel.

DETAILED DESCRIPTION OF THE INVENTION

Figure 1:
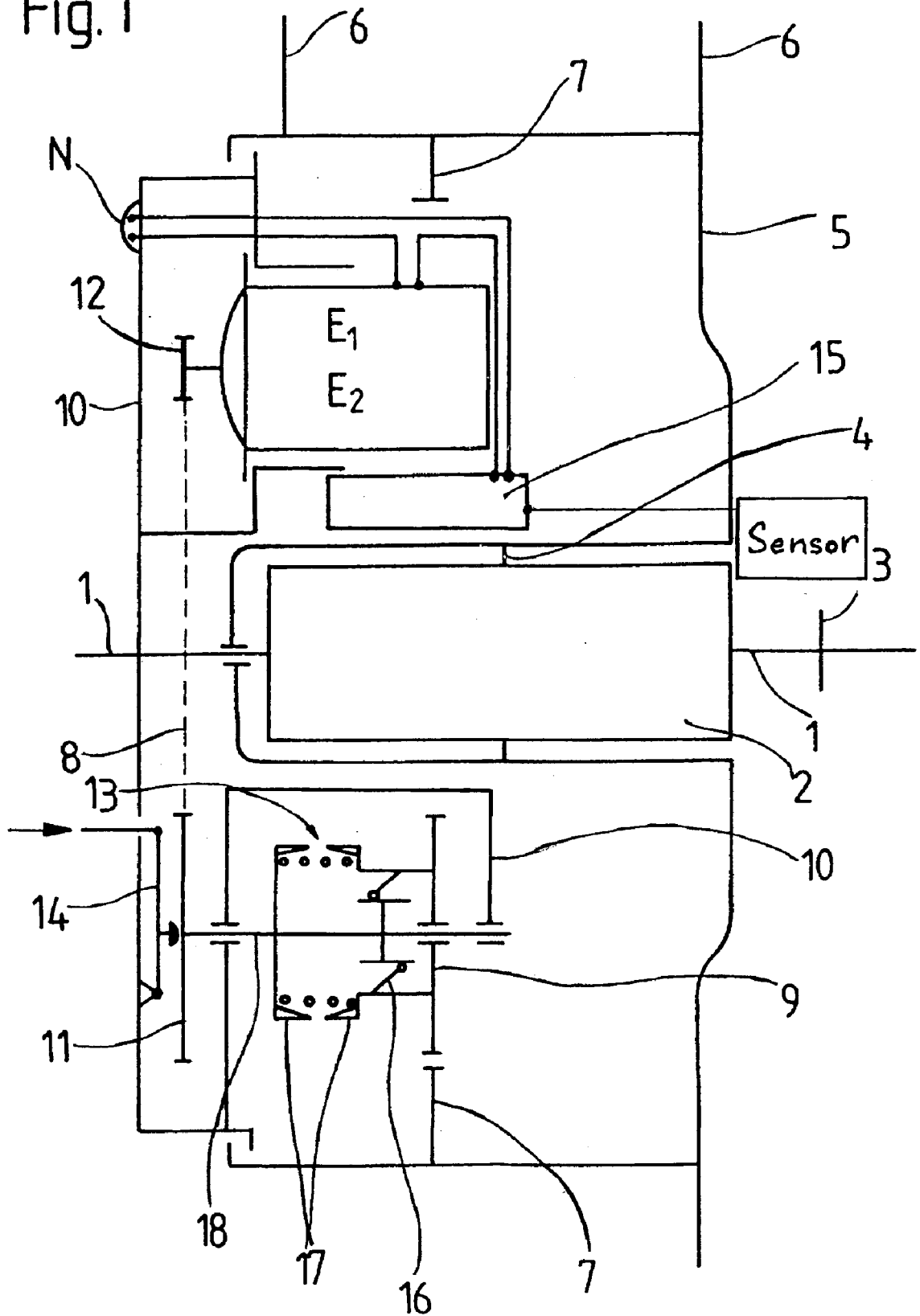
FIG. 1 shows a diagram of a hub body of a drive unit for incorporation into a wheel of a cycle, comprising a transmission carrier with at least one electric motor, an electronic control unit, a transmission and a lockup clutch for a freewheel clutch.

The invention relates to a drive unit with a common hub body on a fixed axle 1, which forms part of a multi-speed hub 2 having a drive pinion 3 and which transmits the input torque here to a hub sleeve 4 in a hub housing 5 of the hub body. The hub housing 5 has spoke flanges 6, which are connected by way of spokes to a wheel of the vehicle. Forming part of the common hub body is a transmission carrier 10, which is rotationally fixed to the axle 1 and serves as assembly carrier for two electric motors E1 and E2, a transmission 8, a clutch 13 and an electronic control unit 15.

FIG. 2 shows how the electric motors E1 and E2 interact with a gear wheel 11 by way of the transmission 8. The gear wheel 11 is connected to a common shaft 18, which can therefore be driven by both electric motors E1 and E2. Starting from the electric motors E1 and E2, the torque flow is then transmitted from the common shaft 18 by way of a freewheel clutch 16 to a drive gear 9, which interacts with an internal gear 7, which is directly connected to the hub housing 5 and hence to the wheel of the vehicle.

According to FIG. 1, therefore, the power flow will run from a motor gear wheel 12 on each of the electric motors E1 and E2 by way of the transmission 8, the gear wheel 11, the shaft 18, the freewheel 16, and the drive gear 9 to the internal gear 7, the power flow in the opposite direction being interrupted by the freewheel 16, unless the freewheel 16 is locked up in the freewheeling direction of rotation, which is possible by means of the clutch 13, which has claws 17, which can be brought into engagement by an actuator 14. Such disabling of the freewheel 16 is necessary when the current source is no longer capable of supplying the vehicle electrical system N. In such an event, provision is made for the hub housing 5 of the hub body to be driven by the wheel, and for the said housing to drive at least one of the two electric motors E1 or E2 backward by way of the transmission 8. The motor E1 and/or E2 then runs in generator mode and feeds the vehicle electrical system N and the vehicle lighting connected thereto. The drive is transmitted to the hub housing 5 by way of the drive pinion 3 by pedaling.

The advantage of using two or more motors is not simply confined to installation in drive units for wheels in two-wheeled vehicles. Rather, the principle is applicable to all battery-fed vehicle drives where it is necessary to take account of the current-carrying capacity of the said batteries and to achieve particularly efficient vehicle operating modes.

What is claimed is:

1. A drive unit for electrically driven vehicles for driving at least one wheel, said drive unit comprising:

two electric motors;

an electronic control unit controlling current fed to said two electric motors such that when accelerating from a standstill and in a mow motor speed range, said two electric motors are fed in an electrical series arrangement, and when in a higher motor speed range, the two electric motors are fed in an electrical parallel arrangement, each of the two electric motors contributing 50% to the electrical performance; and an accumulator feeding energy to said two electric motors, said two electric motors mechanically connected to the at least one wheel during all modes of operation, said two electric motors electronically controlled between all the modes of operation, and said two electric motors operating at the same speed during all the modes of operation.

2. A drive unit according to claim 1, wherein said two electric motors are direct current motors.

3. A drive unit according claim 1, wherein said two electric motors contain permanent magnets.

4. A drive unit according to claim 1, wherein said two electric motors, when electrically connected in parallel or in series, can be actuated by pulse-width modulated current, the electronic control unit regulating the pulse width.

5. A drive unit according to claim 1, wherein up to a predetermined speed of said two electric motors current supply phases, alternately controlled for said two electric motors, do not exceed 50% of an overall phase.

6. A drive unit according to claim 1, wherein at least one of said two electric motors can be operated as a generator to generate power for a vehicle electrical system should a measured power supply feed fail.

7. A drive unit according to claim 1, wherein when said two electric motors are used as generators, said motors are electronically controlled in a series arrangement for increasing voltage.

8. A drive unit according to claim 1, further comprising sensors for detecting a rotational speed of at least one of the wheel and a hub member that is externally driven.

9. A drive unit according to claim 4, wherein the pulse-width modulated actuation is designed in such a way that with said two electric motors connected in parallel a current supply phase of one electric motor of said two electric motors coincides with an open-circuit phase of the other electric motor of said two electric motors.

10. A drive unit according to claim 6, wherein a lockup clutch is provided for a freewheel clutch to ensure that one of said two electric motors acting as generator is driven by way of a transmission when the wheel is externally driven.

11. A drive unit according to claim 8, wherein said two motors are switched off when said rotational speed exceeds a predetermined value.

* * * * *